United States Patent
Da Silva et al.

(10) Patent No.: US 11,057,823 B2
(45) Date of Patent: Jul. 6, 2021

(54) DISTRIBUTION OF SYSTEM ACCESS INFORMATION IN WIRELESS COMMUNICATION SYSTEM

(71) Applicant: Telefonaktiebolaget LM Ericsson (publ), Stockholm (SE)

(72) Inventors: Icaro L. J. Da Silva, Solna (SE); Gunnar Mildh, Sollentuna (SE); Jose Luis Pradas, Stockholm (SE); Johan Rune, Lidingö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/748,890

(22) PCT Filed: Aug. 14, 2015

(86) PCT No.: PCT/EP2015/068775
§ 371 (c)(1),
(2) Date: Jan. 30, 2018

(87) PCT Pub. No.: WO2017/028881
PCT Pub. Date: Feb. 23, 2017

(65) Prior Publication Data
US 2018/0227832 A1    Aug. 9, 2018

(51) Int. Cl.
*H04W 48/10* (2009.01)
*H04W 52/02* (2009.01)
(Continued)

(52) U.S. Cl.
CPC ......... *H04W 48/10* (2013.01); *H04J 11/0069* (2013.01); *H04W 48/08* (2013.01);
(Continued)

(58) Field of Classification Search
CPC ..... H04W 48/10; H04W 48/08; H04W 48/14; H04W 52/0206; H04W 52/0216;
(Continued)

(56) References Cited

U.S. PATENT DOCUMENTS

| 10,075,918 B2 | 9/2018 | Webb et al. |
| 2009/0046800 A1* | 2/2009 | Xu ..................... H04B 7/0617 375/267 |

(Continued)

FOREIGN PATENT DOCUMENTS

| EP | 2413636 A1 | 2/2012 |
| KR | 20150059743 A | 6/2015 |

(Continued)

OTHER PUBLICATIONS

Huawei, "Energy saving techniques for LTE", 3GPP TSG RAN WG2 #69, Feb. 22-26, 2010, pp. 1-9, San Francisco, US, R2-101824 (updates R2-101213).

*Primary Examiner* — Farid Seyedvosoghi
(74) *Attorney, Agent, or Firm* — Christopher & Weisberg, P.A.

(57) ABSTRACT

The present disclosure relates to methods for efficiently transmitting system access information that is used by wireless terminals (200) to access a cell (20) in a wireless communication network (10). The system access information may include synchronization signals, system information, or reference signals used for channel estimation. In exemplary embodiments of the disclosure, the access nodes (100) within the wireless communication network (10) may be configured to operate in two or more operating modes. The information density of the system access information transmitted by the access node varies depending on the operating mode. For example, the access node (100) may vary the information density by varying the amount of (Continued)

system access information that is transmitted or the periodicity of the system access information that is transmitted.

15 Claims, 17 Drawing Sheets

(51) Int. Cl.
H04W 48/08 (2009.01)
H04J 11/00 (2006.01)
H04W 48/14 (2009.01)
H04W 88/08 (2009.01)

(52) U.S. Cl.
CPC ....... *H04W 48/14* (2013.01); *H04W 52/0206* (2013.01); *H04W 52/0216* (2013.01); *H04W 52/0274* (2013.01); *H04J 2211/005* (2013.01); *H04W 88/08* (2013.01); *Y02D 30/70* (2020.08)

(58) Field of Classification Search
CPC ............... H04W 52/0274; H04W 88/08; H04J 11/0069; H04J 2211/005; Y02D 70/00; Y02D 70/1262; Y02D 70/164; Y02D 30/70

USPC ........................................................ 455/434
See application file for complete search history.

(56) References Cited

U.S. PATENT DOCUMENTS

| 2009/0290550 | A1* | 11/2009 | Bhattad | H04W 72/082 370/329 |
| 2009/0316593 | A1* | 12/2009 | Wang | H04W 74/0833 370/252 |
| 2010/0105401 | A1* | 4/2010 | Chun | H04W 48/12 455/450 |
| 2012/0163305 | A1* | 6/2012 | Nimbalker | H04W 52/0206 370/329 |
| 2015/0223258 | A1* | 8/2015 | Jung | H04W 72/082 455/452.1 |
| 2016/0234735 | A1* | 8/2016 | Kubota | H04W 48/14 |

FOREIGN PATENT DOCUMENTS

| WO | 2013068368 A1 | 5/2013 | |
| WO | WO-2013068368 A1 * | 5/2013 | ............ H04W 48/08 |
| WO | 2014036692 A1 | 3/2014 | |
| WO | 2014139570 A1 | 9/2014 | |

* cited by examiner

DISTRIBUTION OF SYSTEM ACCESS INFORMATION IN WIRELESS COMMUNICATION SYSTEM

TECHNICAL FILED

The present disclosure relates generally to distribution of system access information in a wireless communication network and, more particularly to methods and apparatus to reduce energy used for the transmission of system access information.

BACKGROUND

In order to establish a connection with a Long Term Evolution (LTE) network, a wireless terminal (wireless terminal) needs to synchronize with a cell within the network, read system information (SI) from a broadcast channel in the selected cell, and perform a random access (RA) procedure to establish a connection with the selected cell. The first of these steps is commonly referred to as cell search.

To assist the wireless terminal in the cell search procedure, the access node transmits two synchronization signals on the downlink; the primary synchronization signal (PSS) and the secondary synchronization signal (SSS). The synchronization signals transmitted in each cell comprise a specific set of sequences that encode the physical cell identity (PCI). Once synchronization and PCI detection is performed, the wireless terminal is capable of performing channel estimation using cell specific reference signals (CSRSs) and decode the system information. System information (SI) includes information such as the downlink and uplink cell bandwidths, the uplink/downlink configuration in the case of TDD, system parameters related to random access transmission and uplink power control, and similar control and configuration information. The synchronization signals, system information (SI) and reference signals for channel estimation are referred to herein collectively as system access information.

The system access information is repeatedly broadcast by the network at predetermined intervals to enable wireless terminals to quickly access and operate within the network. It has been observed that, in LTE systems, there is a high energy consumption even in a cell with little or no traffic due to the transmission of the system access information. A large part of the energy consumption is due to the continuous transmission of system access information. Thus, the continuous transmission of these signals reduces the time to access the network at the cost of higher energy consumption.

SUMMARY

The present disclosure relates to methods for efficiently transmitting system access information that is used by wireless terminals to access a cell in a wireless communication network. The system access information may include synchronization signals, system information, or reference signals used for channel estimation. In exemplary embodiments of the disclosure, the access nodes within the network may be configured to operate in two or more operating modes. The information density of the system access information transmitted by the access node varies depending on the operating mode. For example, the access node may vary the information density by varying the amount of system access information that is transmitted or the periodicity of the system access information that is transmitted.

In one embodiment, the operating modes include a normal power mode (also referred to as an active mode) and a low power mode (also referred to as the dormant operating mode). A greater amount of system access information is transmitted in the normal power mode and a lesser amount of system access information is transmitted in the low power mode. The information transmitted in the low power mode will typically not be sufficient to access the network, but may be sufficient to allow the wireless terminal to synchronize with the access node. A wireless terminal may send a request to an access node on an uplink channel to request additional system access information in order to gain network access. In one exemplary embodiment, the access node may change from the low power mode to the normal mode responsive to detection of the request and transmit the additional system access information. In other embodiments, the access node may send the wireless terminal additional system access information while remaining in a low power mode, i.e. without changing operating modes.

DETAILED DESCRIPTION

Figure 1:
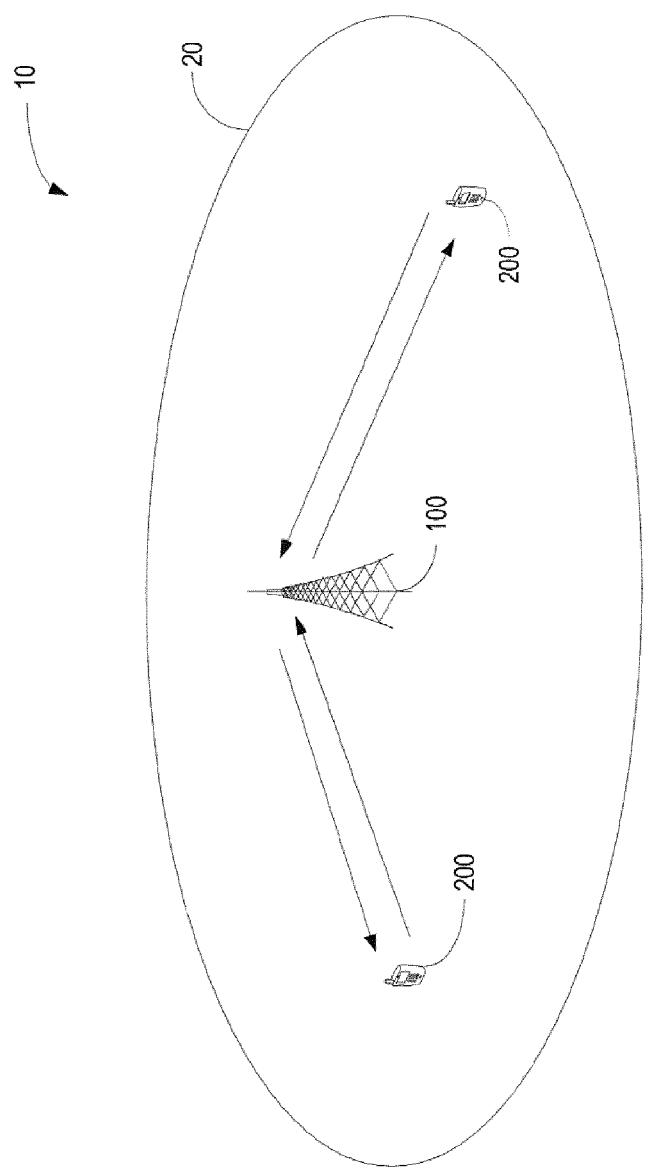
FIG. 1 illustrates an exemplary communication network.

Turning now to the drawings, FIG. 1 illustrates an exemplary communication network 10 according to one exemplary embodiment of the disclosure. The exemplary embodiments of the disclosure are described in the context of a Long Term Evolution (LTE) system, which is specified in Release 10 of the LTE standard. However, those skilled in the art will appreciate that the techniques and concepts herein described are applicable to communication networks 10 operating according to other standards.

The communication network 10 comprises a plurality of access nodes 100 providing radio coverage in respective cells 20 of the communication network 10. While one cell 20 only is illustrated in FIG. 1, it will be appreciated that a communication network 10 typically comprises many cells 20. The access nodes 100 communicate with wireless terminals 200 within respective cells served by the access nodes 100.

Figure 2:
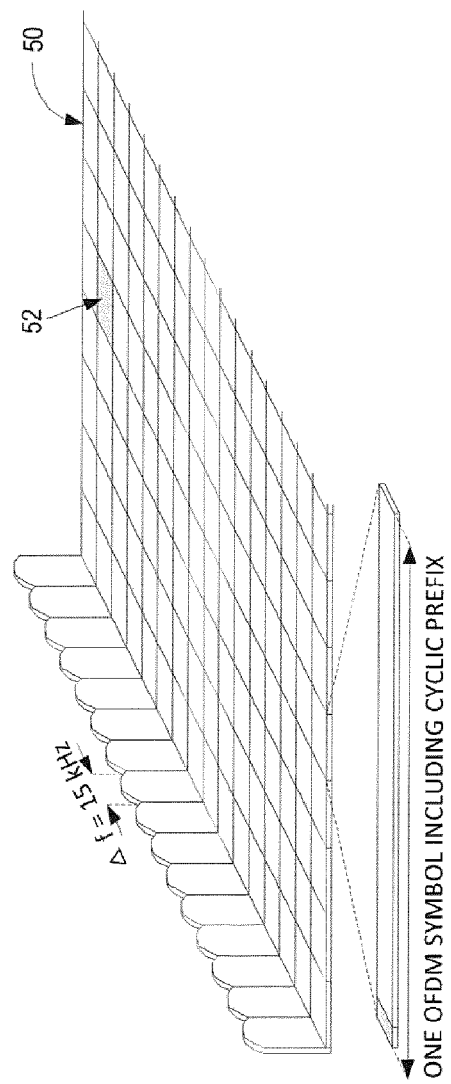
FIG. 2 illustrates an exemplary time-frequency grid for an LTE system.

LTE uses Orthogonal Frequency Division Multiplexing (OFDM) in the downlink and Discrete Fourier Transform (DFT) spread OFDM in the uplink. The basic LTE downlink physical resource can be viewed as a time frequency grid. FIG. 2 illustrates a portion of an exemplary OFDM time frequency grid 50 for LTE. Generally speaking, the time frequency grid 50 is divided into 1 ms sub-frames. Each sub-frame includes a number of OFDM symbols. For a normal cyclic prefix (CP) link, suitable for use in situations where multipath dispersion is not expected to be extremely severe, a sub-frame comprises 14 OFDM symbols. A sub-frame comprises 12 OFDM symbols if an extended cyclic prefix is used. In the frequency domain, the physical resources are divided into adjacent subcarriers with a spacing of 15 KHz. The number of subcarriers varies according to the allocated system bandwidth. The smallest element of the time frequency grid is a resource element 52. A resource element 52 comprises 1 OFDM subcarrier during 1 OFDM symbol interval.

In order to establish a connection with a Long Term Evolution (LTE) network, a wireless terminal 200 needs to synchronize with a cell 20 within the network 10, read system information (SI) broadcast in the selected cell 20, and perform a random access (RA) procedure to establish a connection with the selected cell 20. The first of these steps is commonly referred to as cell search.

Figure 3:
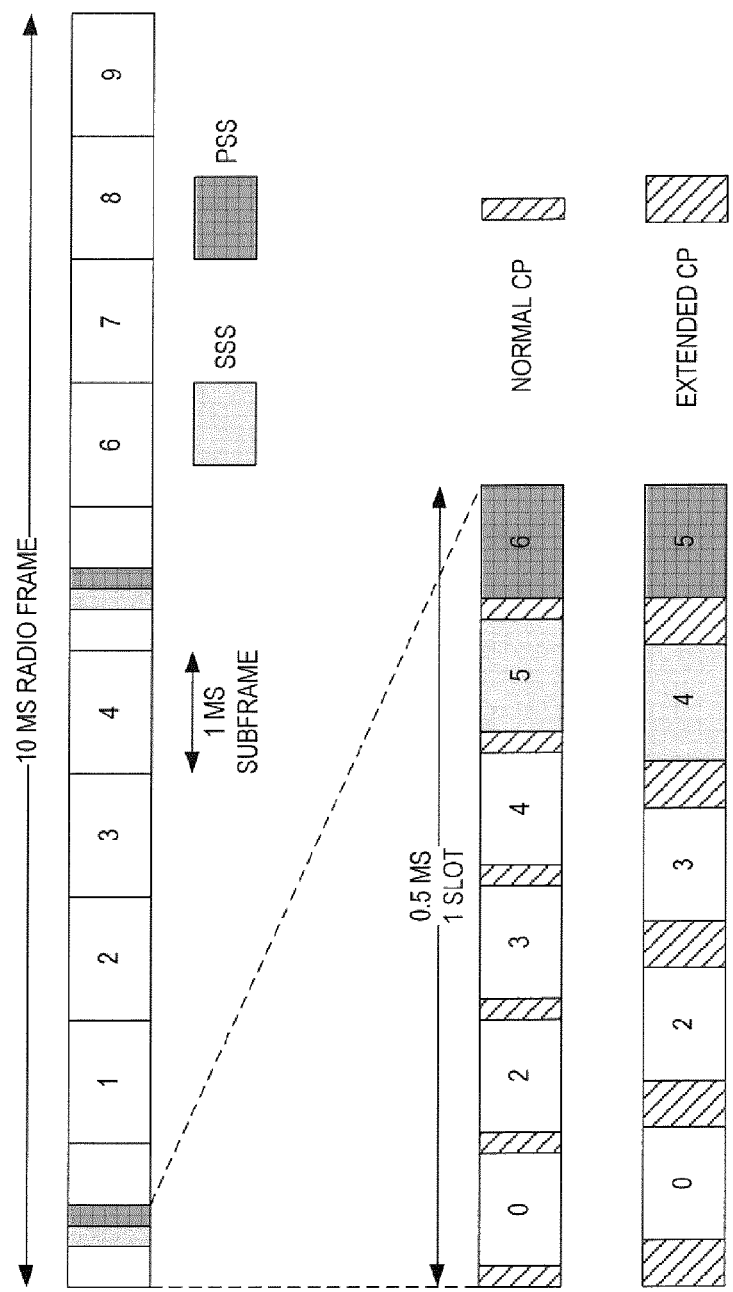
FIG. 3 illustrates a PSS and SSS frame and slot structure in the time domain when Frequency Division Duplexing (FDD) is used.
Figure 4:
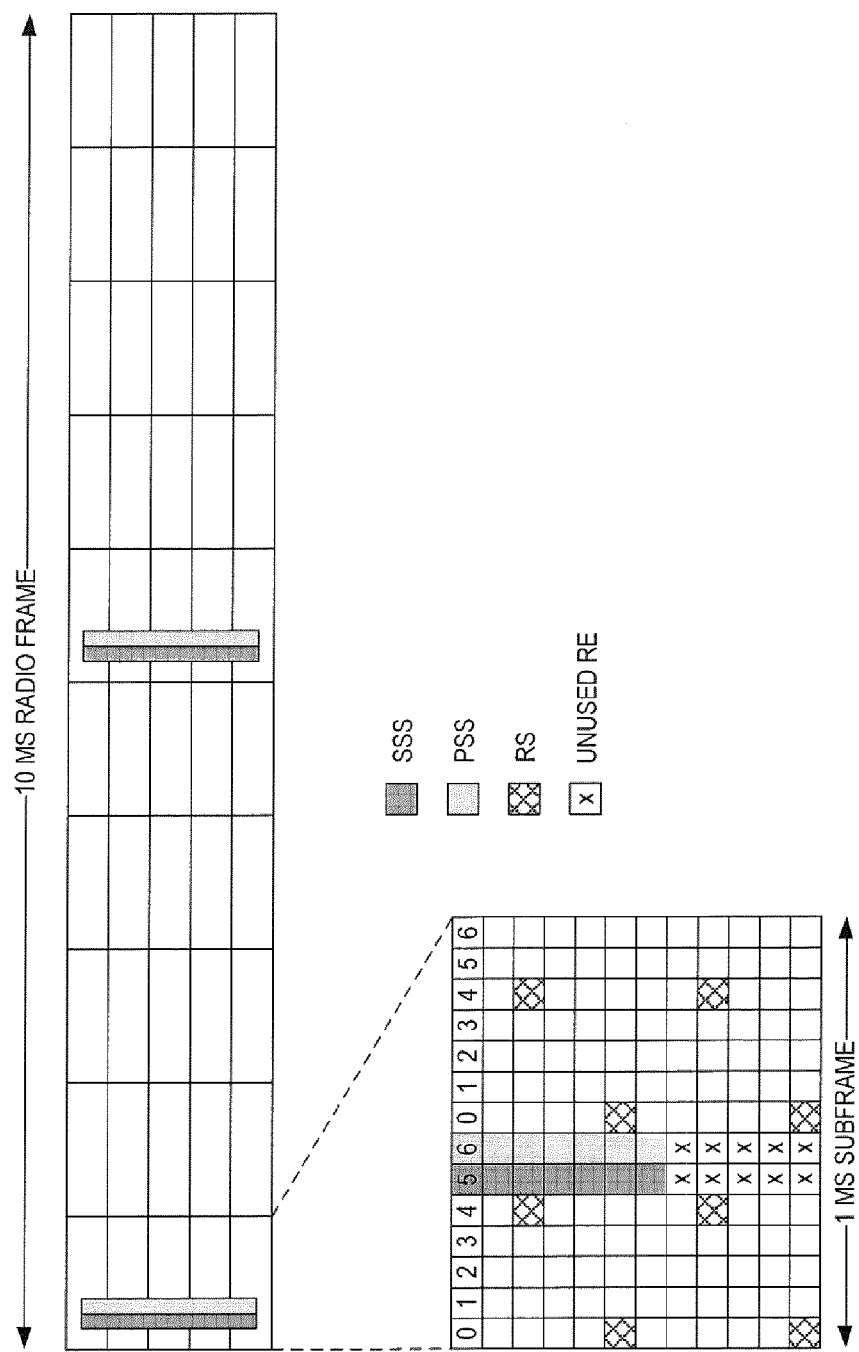
FIG. 4 illustrates certain broadcast signals from a physical layer point of view.

To assist the wireless terminal 200 in the cell search procedure, the access node 100 transmits two synchronization signals on the downlink; the primary synchronization signal (PSS) and the secondary synchronization signal (SSS). FIG. 3 illustrates the synchronization signals transmitted in LTE FDD systems. The synchronization signals transmitted in each cell 20 comprise a specific set of sequences that encode the physical cell identity (PCI). Once synchronization and PCI detection is performed, the wireless terminal 200 is capable of performing channel estimation using cell 20 specific reference signals (CSRSs) and decode the system information. FIG. 4 illustrates the broadcasted signals (PSS/SSS/CSRS) from a physical layer point of view.

System information (SI) includes information about the downlink and uplink cell 20 bandwidths, the uplink/downlink configuration in the case of TDD, system parameters related to random access transmission and uplink power control, and similar control and configuration information. The wireless terminal 200 needs to acquire the system information in order to gain access to and operate within the network 10.

In LTE, system information is structured into system information blocks (SIBs). Each SIB contains a set of functionally related system parameters. The SIB types that have been defined include:

Master Information Block (MIB), which includes a limited number of the most frequently transmitted parameters which are essential for a wireless terminal 200's initial access to the network 10.

System Information Block Type 1 (SIB1), which contains parameters needed to determine if a cell 20 is suitable for cell 20 selection, as well as information about the time-domain scheduling of the other SIBs.

System Information Block Type 2 (SIB2), which includes common and shared channel information.

SIB3-SIB8, which include parameters used to control intra-frequency, inter-frequency and inter-RAT cell 20 reselection.

SIB9, which is used to signal the name of a Home eNodeB (HeNB).

SIB10-SIB12, which includes the Earthquake and Tsunami Warning Service (ETWS) notifications and Commercial Mobile Alert System (CMAS) warning messages.

SIB13, which includes MBMS related control information (See Section 13.6.3.2).

SIB14, which is used to configure Extended Access Class Barring (EAB).

SIB15, which is used for convey MBMS mobility related information.

SIB16, which is used to convey GPS-related information.

The list of system information blocks has been expanding over the years and is expected to continue increasing in upcoming releases of the LTE Standard.

Both the system information, synchronization signals, and reference signals for channel estimation (referred to collectively as system access information) are repeatedly broadcast by the access node 100 at predetermined intervals to enable wireless terminals 200 to access and operate within the network 10. The MIB and SIB1 messages are broadcast with periods of 40 ms and 80 ms respectively. In the case of the MIB, the transmission is repeated 4 times during each 40 ms period, i.e. once every 10 ms. In the case of SIB1, the transmission is repeated 4 times in each period, i.e. every 20 ms, but with different redundancy version for each transmission. The time domain scheduling of the SI messages containing other SIBs is dynamically flexible. Each SI message is transmitted in a defined periodically occurring time domain window. Physical layer control signaling indicates which sub-frames within the window the SI is scheduled for transmission. The scheduling windows for different SI messages (referred to herein as SI windows) are consecutive, i.e. there are no overlaps or gaps between them, and have a common link that is configurable. SI windows can include sub-frames in which it is not possible to transmit SI messages such as sub-frames used for SIB1, and sub-frames used for uplink in TDD.

Figure 5:
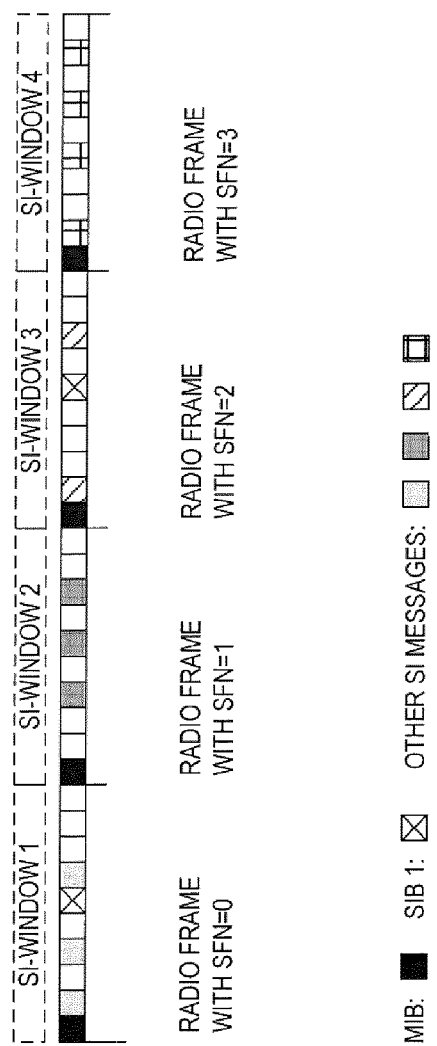
FIG. 5 illustrates time-domain scheduling of system information in an LTE network.
Figure 6:
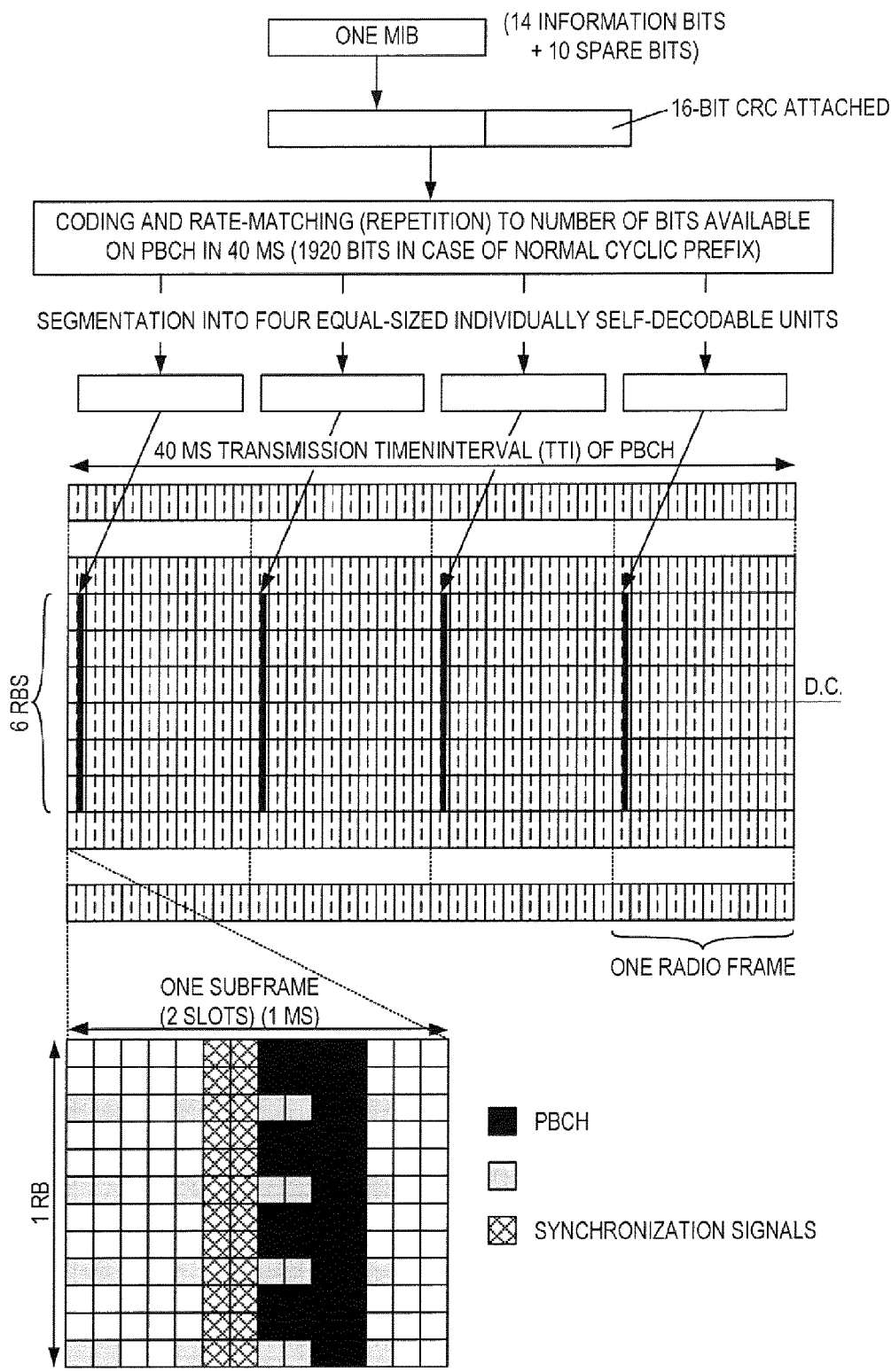
FIG. 6 illustrates a Physical Downlink Shared Channel (PDSCH) structure in an LTE network for transmitting system information.

FIG. 5 illustrates an example of time domain scheduling of SI showing the sub-frames used to transfer the MIB, SIB1, and four additional SI messages. The example uses an SI window of ten sub-frames. The physical channel on which the SI information is transmitted may differ for different SIBs. For example, the MIB is transmitted over the Physical Broadcast Channel (PBCH) as shown in FIG. 6 while the other SIBs are transmitted over the Physical Downlink Shared Channel (PDSCH) so that they can be flexibly scheduled in other portions of the frequency band.

The distribution of system access information comprises a significant portion of the energy consumption in a typical access node 100. The system access information are continuously broadcast even when there is little or no traffic within a cell 20 so that wireless terminal 200 entering the cell 20 can quickly gain network access. There may be scenarios in which cells 20 do not carry any traffic or do not have users. Therefore, there would be a potential advantage if the network 10 could adapt the system access information broadcast during those periods to minimize energy consumption.

One approach to minimize the amount of system access information that is broadcast is to aggregate system information based on the following design principles Some access nodes 100 in the network 10 do not need to broadcast the system information.
   Access nodes 100 transmitting system information may aggregate and transmit system information for multiple access nodes 100 in the system. The aggregated system information may, for example, be contained in an Access Information Table (AIT).
   The AIT may be transmitted frequently (e.g. every few dozens of milliseconds) or infrequently (e.g. every few seconds).
   Each entry in the AIT may contain essential information for network access similar as the essential information in LTE which is contained in MIB/SIB1/SIB2.
   Each access node 100/cell 20 may transmit a system signature index (SSI) which is associated to an entry in the AIT.
   A SSI may have similar properties and characteristics as the PSS/SS synchronization signals in LTE.
   A wireless terminal 200 detecting the SSI and having a valid stored AIT knows the essential system information to access that access node 100/cell 20.
   SSI may be transmitted often (in the order of dozens to hundreds of milliseconds).

Figure 7:
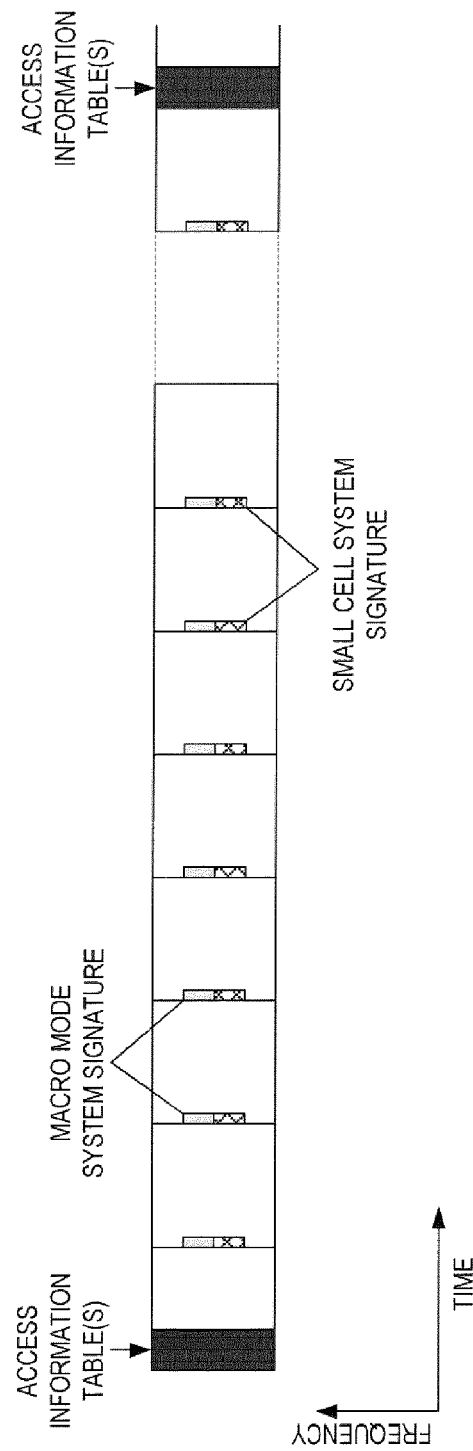
FIG. 7 illustrates a transmission scheme for transmitting aggregated system information.

An example of the aggregated approach for system information outlined above is shown in FIG. 7. This approach aims to reduce the amount of broadcast information assuming that most of the time the wireless terminal 200 has access to the possible configurations from an internally stored copy of a previously received AIT. The wireless terminal 200 can use the broadcast indices, which can be called system signatures (i.e. SSIs), to point to the correct configuration for a given area.

While the aggregated approach described above focuses on minimizing network energy consumption, it may impact the access delay when a wireless terminal 200 has no prior information before accessing the system. This situation may occur in system where the system information configurations (e.g., AITs) are broadcasted very infrequently (e.g. 10 seconds). Even when the indices are broadcast more frequently, there can be scenarios where a wireless terminal 200 needs to acquire new configurations, which can increase the time needed to access the system. Thus, while the aggregated system information approach reduces the amount of system information that is broadcast and thus reduces energy consumption in low traffic scenarios, it can lead to very long delays in scenarios where the wireless terminal 200 does not have a priori information and thus needs to acquire the system information configurations.

An alternative approach for reducing energy consumption is to reduce an amount of system access information that is transmitted when there is little or no user traffic in a cell 20. In this approach, an access node 100 may be configured to operate in two or more operating modes for purposes of distributing system access information. The information density of the system access information varies depending on the operating mode. For example, the access node 100 may vary the information density by varying the amount of system access information that is transmitted or the periodicity of the system access information that is transmitted.

The operating modes in one embodiment may include a normal power mode and low power mode. In the normal power mode, the access node 100 transmits first system access information with an information density selected for quick network access. In the low power mode, the access node 100 transmits second system access information with an information density selected for energy savings, which is less than the information density in the normal power mode. The reduction in the information density can be achieved by transmitting less than all of the system information that is transmitted in the normal power mode, transmitting fewer synchronization signals, and/or transmitting a fewer number of reference symbols as compared to the normal power mode. The system information transmitted in the low power mode may be a subset of the system information transmitted in the normal power mode and/or may contain additional system information not transmitted in the normal power mode. In other embodiments, the reduction in the information density can be achieved by varying the periodicity of the system information, synchronization signals, and/or reference signals used for channel estimation. Either the access node 100 or centralized network node determines the operating mode based on factors such as cell load and wireless terminal 200 activity in a cell 20; cell load, wireless terminal 200 activity in neighboring cells 20, time of day, or statistical information regarding cell load and wireless terminal 200 activity. Those skilled in the art will appreciate that this listing of factors is not exhaustive and that other factors may also be considered.

In one exemplary embodiment, a central management entity located in one of the network nodes may configure the access nodes 100 in a certain area to operate in one of the different operating modes depending on "area activity". The area may comprise a cell 20, group of cells 20, groups of beams (when beam forming is used), or radio access technologies (RAT). The area activity may be measured by the frequency and/or number of system access attempts in that area. As a general rule, areas where the frequency or number of access attempts is greater than a threshold may be configured to operate in the normal power mode. Areas with a lower frequency or number of access attempts may be configured to operate in one of the low power modes. In some embodiments, the management entity may configure the access nodes 100 within the particular area based on statistical information regarding cell 20 load and wireless terminal 200 activity. Also, the management entity may configure the access nodes 100 within the particular area to operate in different modes at different times of day.

When different operating modes are possible, the normal power mode may be defined by the maximum amount of broadcast system access information. A low power modes may be defined by the minimum amount of broadcast system access information. For example, the access node 100 may transmit the maximum amount of system information in normal power mode and less than all the system information in the low power mode. Similarly, access node 100 may transmit the maximum number or amount of synchronization signals and/or reference signals (e.g., CCSRSs) in normal power mode and fewer synchronization signals and/or reference signals in the low power mode. Those skilled in the art will appreciate that additional operating modes may be defined with different configurations of system access information.

Access Node Operation

In one exemplary embodiment, the access node 100 serving a wireless terminal 200 or other network node indicates the current operating mode of the access node 100 to the wireless terminal 200 in the area covered by the access node 100. The information regarding the current operating mode may be transmitted on a broadcast channel, encoded in reference signals, and/or included in system information. In one exemplary embodiment, the current operating mode is carried by the sequence identity (S_ID), which identifies a node, beam, or area. A default operating mode may be defined which does not need to be signaled by the access node 100. Thus, access nodes 100 not supporting different operating modes do not need to indicate the operating mode in which the access node 100 is configured. Also, those skilled in the art will appreciate that the current operating mode may be implicitly signaled by the presence or absence of certain signals. For example, the presence or absence of certain reference signals and/or system information may implicitly indicate the current operating mode of the access node 100 to the wireless terminal 200. Also, different synchronization signals may be transmitted in different operating modes.

In some embodiments, an access node 100 may transmit a limited set of system access information in a low power mode. This limited set of system access information, may include synchronization signals and a limited set of system information, referred to herein as initial system information (ISI). The limited set of system access information may be used to check whether access is allowed to a cell 20 and, if so, to achieve synchronization and send an access request to the access node 100 to request further system access information. The ISI may contain information related to procedures for accessing the network 10. In one exemplary embodiment, the ISI contains an access allowed (AA) flag that indicates whether network access is allowed in that cell 20. The access node 100 may also transmit the PSS and SSS to enable wireless terminal 200 to synchronize to the cell 20. After acquiring synchronization, the wireless terminal 200 may read the ISI to determine whether the network access is allowed and, if so, transmit an access request on an uplink channel to the access node 100 to request that the access node 100 transmit additional system access information. The request may be transmitted, for example, on the Physical Uplink Control Channel (PUCH), or may be encoded into a preamble transmitted on a random access channel (RACH). The period at which the ISI is transmitted may be adjusted to either reduce energy consumption or to reduce the time needed to gain access to the network 10. To reduce energy consumption, a longer time window or period may be used for transmitting the ISI. To reduce the time needed for a wireless terminal 200 to access a network 10, a shorter time window or period for the ISI may be used. The selection of the time window or period will therefore represent a trade-off between energy consumption and the amount of time needed to access the network 10.

In some embodiments, the access node 100 may be configured to change its operating mode responsive to the receipt of the access request from a wireless terminal 200. In one exemplary embodiment, upon receipt of the access request, the access node 100 determines whether it is allowed to change its operating mode. For example, the access node 100 may be prohibited from changing its operating mode at certain times of the day when little or no traffic is expected. When a change in the operating mode is prohibited, the access node 100 may ignore the access request. In this case, the wireless terminal 200 may search for other cells 20. If changes in the operating modes are allowed, the access node 100 changes to a normal power mode or other operating mode responsive to the receipt of an access request from a wireless terminal 200 and begins transmitting system access information configured for the normal power mode. In some embodiments, the access node 100 may switch from a low power mode to an intermediate mode that provides additional system access information that would enable the wireless terminal 200 to access the cell 20 without switching to the normal power mode.

The system information and/or reference signals may be transmitted by the access node 100 in pre-defined downlink resources or channels, i.e. pre-defined time slots and frequencies that are known to the wireless terminal 200 or previously signaled to the wireless terminal 200.

In some embodiments, an access node 100 in low power mode may be configured to transmit additional system access information to a wireless terminal 200 responsive to detection of the access request from the wireless terminal 200 while remaining in the low power mode, i.e. without changing operating modes. In one exemplary embodiment, the additional system access information transmitted responsive to the access request is transmitted on pre-defined time frequency resources. For example, a pre-defined time slot and frequency may be reserved for the additional system access information. The pre-defined time slot may be a fixed time slot within a radio frame or subframe, or may comprise a time slot in a time window defined relative to the timing of the access request, e.g., the third time slot in the fourth subframe following the access request.

In some embodiments, the downlink resources for the additional system access information may be indicated by the access request. For example, the additional system access information may be transmitted at a fixed time slot or in a time window after the transmission of the access request. Similarly, the frequency resources may be defined by the frequency, format or value of the access request, or the time slot in which the access request was transmitted or received.

In one exemplary embodiment, the access node 100 may be configured to transmit the additional system access information and thereafter refrain from transmitting the system access information unless it receives another access request, either from the same wireless terminal 200 or a different wireless terminal 200. In one exemplary embodiment, the access node 100 may transmit the additional system access information a pre-determined number of times responsive to the access request without changing the operating mode. After the pre-determined number of transmissions, the access node 100 refrains from transmitting the additional system access information.

In some embodiments, the access node 100 may be configured to transmit the additional system access information in the low power mode with a relatively long period, e.g., every 2-10 seconds. In response to detection of the access request, the access node 100 may shift the time window for transmission of the additional system access information to reduce the acquisition time from the perspective of the wireless terminal 200.

In some embodiments, the access node 100 may be configured to notify access nodes 100 in neighboring cells 20 when it transitions from one operating mode to another. For example, the access node 100 may be configured to send an activation signal over a back haul link to access nodes 100 in neighboring cells 20 to activate signals needed by the wireless terminal 200 to make neighbor cell 20 measurements, such as mobility reference signals. Thus, the wireless terminal 200 that sent the access request will be able to access the network 10 and perform measurements needed for cell 20 selection and re-selection.

Figure 8:
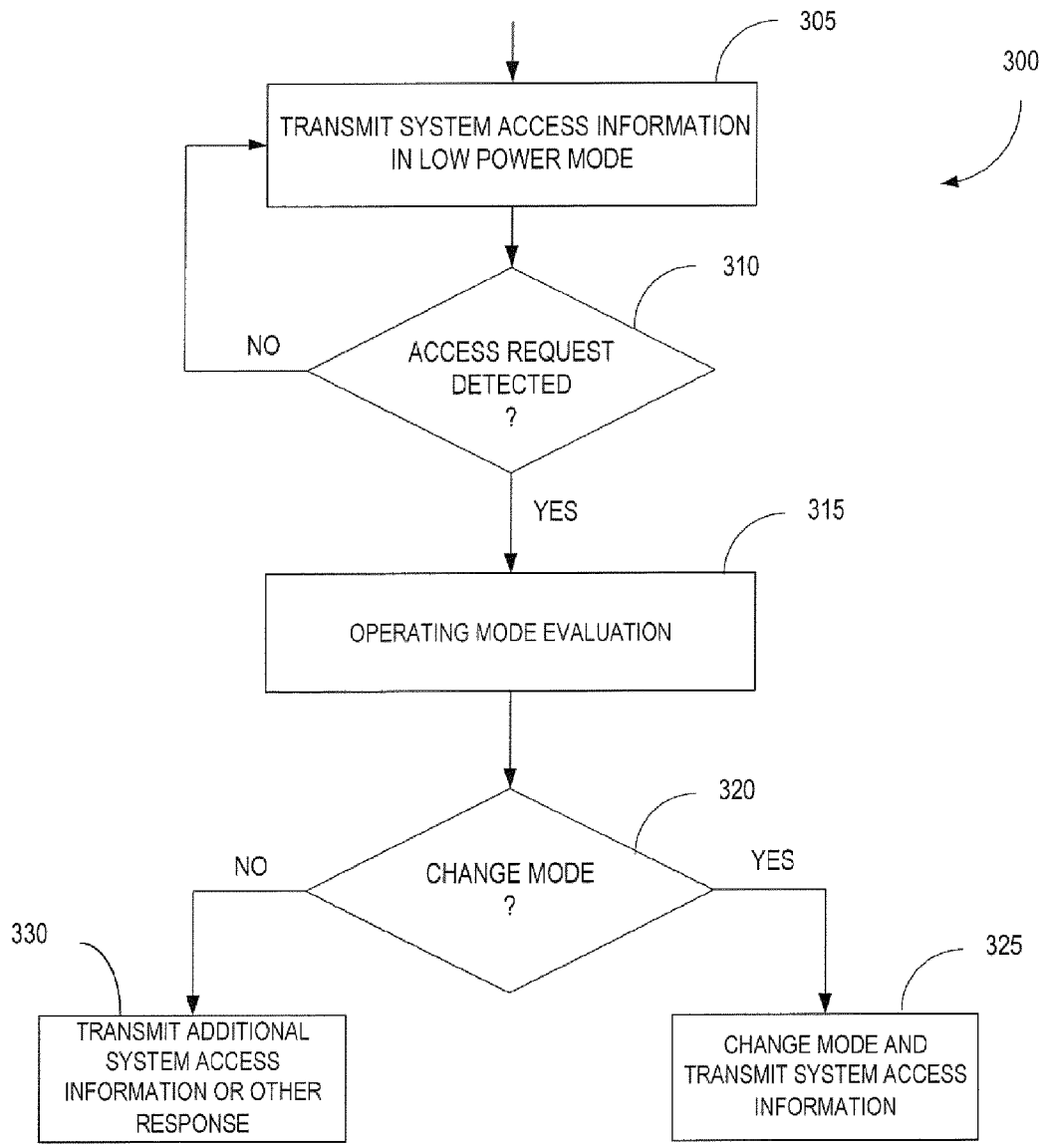
FIG. 8 illustrates an exemplary procedure implemented by an access node for transmitting system access information.

FIG. 8 illustrates an exemplary procedure 300 implemented by an access node 100 while the access node 100 is in a low power mode. The procedure begins when the access node 100 enters the low power mode. While in the low power mode, the access node 100 may send a limited set of system access information as previously described (block 305). While in the low power mode, the access node 100 periodically checks for transmission of an access request by a wireless terminal 200 in the coverage area of the access node 100 (block 310). If no access request is detected, the access node 100 remains in the low power mode. If an access request is detected, the access node 100 determines whether to change the operating mode (block 315). If it is determined to change the operating mode (block 320), the access node 100 changes the operating mode and begins transmitting system access information for the new operating mode (block 325). In one exemplary embodiment, the access node 100 switches from a low power mode to a normal power mode and beings transmitting the maximum set of system access information. If the access node 100 decides not to change modes (block 320), the access node 100 may send additional system access information without changing operating modes, or may send another response to the wireless terminal 200 (block 330). In some embodiments, the response may comprise a stop indication or back-off indication instructing the wireless terminal 200 to refrain from sending further access requests. In other embodiments, the access node 100 may respond by sending additional system access information without changing operating modes. The access node 100 may repeat the additional system access information a pre-determined number of times and then refrain from sending further the additional system access information.

Wireless Terminal 200 Operation

A wireless terminal 200 may be configured to recognize the different operating modes of an access node 100. In general, a wireless terminal 200 that needs to access the network 10 will acquire synchronization and read the system information that is transmitted by the access node 100. The wireless terminal 200 may be configured to detect the current operating mode of the access node 100. In some embodiments, the current operating mode of the access node 100 may be explicitly signaled by the access node 100 in the form of a mode indication that is transmitted as part of the system information. In other embodiments, the current operating mode of the access node 100 may be implicitly signaled to the wireless terminal 200 by the presence or absence of certain system information and/or reference signals. In some embodiments, the operating mode is explicitly signaled in the ISI transmitted by the access node 100 in the low power mode. In other embodiments, the operating mode is explicitly signaled by encoding the operating mode into other signals transmitted by the access node 100, such as the S_ID and/or reference signals. As previously indicated, the ISI may also include an access allowed (AA) flag indicating whether access to the cell 20 is allowed. If the access node 100 is in a low power mode and the AA flag is set to allow network access, the wireless terminal 200 may send an access request to the access node 100 for additional system access information needed for accessing the cell 20. Upon transmitting the access request, the wireless terminal 200 starts monitoring for a response from the access node 100.

In some embodiments, the wireless terminal 200 may have a priori knowledge of an access node in vicinity of the wireless terminal 200. The wireless terminal 200 may start a timer and monitor the downlink channels for system access information. If the wireless terminals 200 does not receive system access information before expiration of the timer, the wireless terminal may assume that the access node is in a low power mode and send an access request to the access node. The wireless terminal 200 may have a priori knowledge of the access node in this embodiment.

In some embodiments, the access request may be transmitted by the wireless terminal 200 in pre-defined downlink resources or channels, i.e. a pre-defined time slot and frequency. The pre-defined downlink resource for transmission of the access request may be fixed in time and/or frequency. The access request may be the same for all wireless terminals 200 or may be different for different wireless terminal 200. In some embodiments, different wireless terminal 200 may be assigned different UL resources for transmitting the access request to avoid collisions and interference. In other embodiments, the wireless terminal 200 may be configured to transmit the same access request on the same time frequency resources. In this case, the transmissions from different wireless terminal 200 may combine over the air and be detected by the access node 100 as a single transmission in a manner similar to the case of multi-path transmission. The position and format of the access request may be fixed for all scenarios, may be configured by a management entity in the network 10, or may be specified by the standards. In one exemplary embodiment, a finite set of fixed configurations may be specified by the applicable standards and a management entity may configure the access nodes 100 with one of the fixed configurations in the finite set.

In some embodiments, the access request may have the format similar to a dedicated preamble that is used for random access in LTE. The preamble-like format may be pre-defined by the standard and thus known to the wireless terminal 200. In other embodiments, the format of the access request may be signaled to the wireless terminal 200 in a limited set of ISI that is transmitted by the access node 100 operating in the low power mode.

The wireless terminal 200 may be configured to listen for a response from an access node 100 after it transmits the access request. In one exemplary embodiment, the wireless terminal 200 starts monitoring for further system access information in pre-defined downlink resources. As previously noted, the downlink resources for the additional system access information may be fixed in time and/or frequency. In other embodiments, the timing and/or frequency of the additional system information and/or reference signals may be dependent on the time and/or frequency of the request. For example, in one embodiment, the access node 100 may transmit in a specified time slot following transmission of the access request, or in a specified time window. The time slot or time window may be determined by a time offset that is specified by the standard or signaled to the wireless terminal 200 as part of the ISI. Similarly, the frequency resources of the additional system access information may be the same frequency used for transmission of the access request, or may be a selected frequency that depends on the frequency of the access request.

In some embodiments, the wireless terminal 200 may be configured to re-transmit the access request if no response is received from the access node 100. For example, the wireless terminal 200 may start a re-transmission timer when it sends an access request. If the re-transmission timer expires without a response from the access node 100, the wireless terminal 200 may transmit another access request. The timer may be restarted each time an access request is transmitted and stopped when additional system access information is received. In one embodiment, the wireless terminal 200 may be configured to stop transmitting the access request after a pre-determined maximum number of transmissions. The maximum number of transmissions may be specified by the standard or may be signaled as part of the ISI. In some embodiments, when the maximum number of transmissions has been made without response, a notification to higher layer protocols may be triggered. For example, the notification may be sent to a radio resource management (RRM) entity and lead to a cell 20 reselection, or inter-RAT selection.

In some embodiments, the wireless terminal 200 may receive an indication from the access node 100 requesting the wireless terminal 200 to stop sending the request. In one embodiment, the indication may comprise a stop indication instructing the wireless terminal 200 to stop sending the access request. In other embodiments, the indication may comprise a back-off indication instructing the wireless terminal 200 to stop sending the access request until a certain back-off period has expired. The back-off period may be pre-defined in the standard. Alternatively, the back-off period may be included in the ISI transmitted to the wireless terminal 200, or specified by the value of the indication. In some embodiments, a pre-defined back-off window may be defined in the standard or signaled to the wireless terminal 200. The wireless terminal 200 may be configured to randomly select a time slot in the back-off window at which to transmit the next access request.

Figure 9:
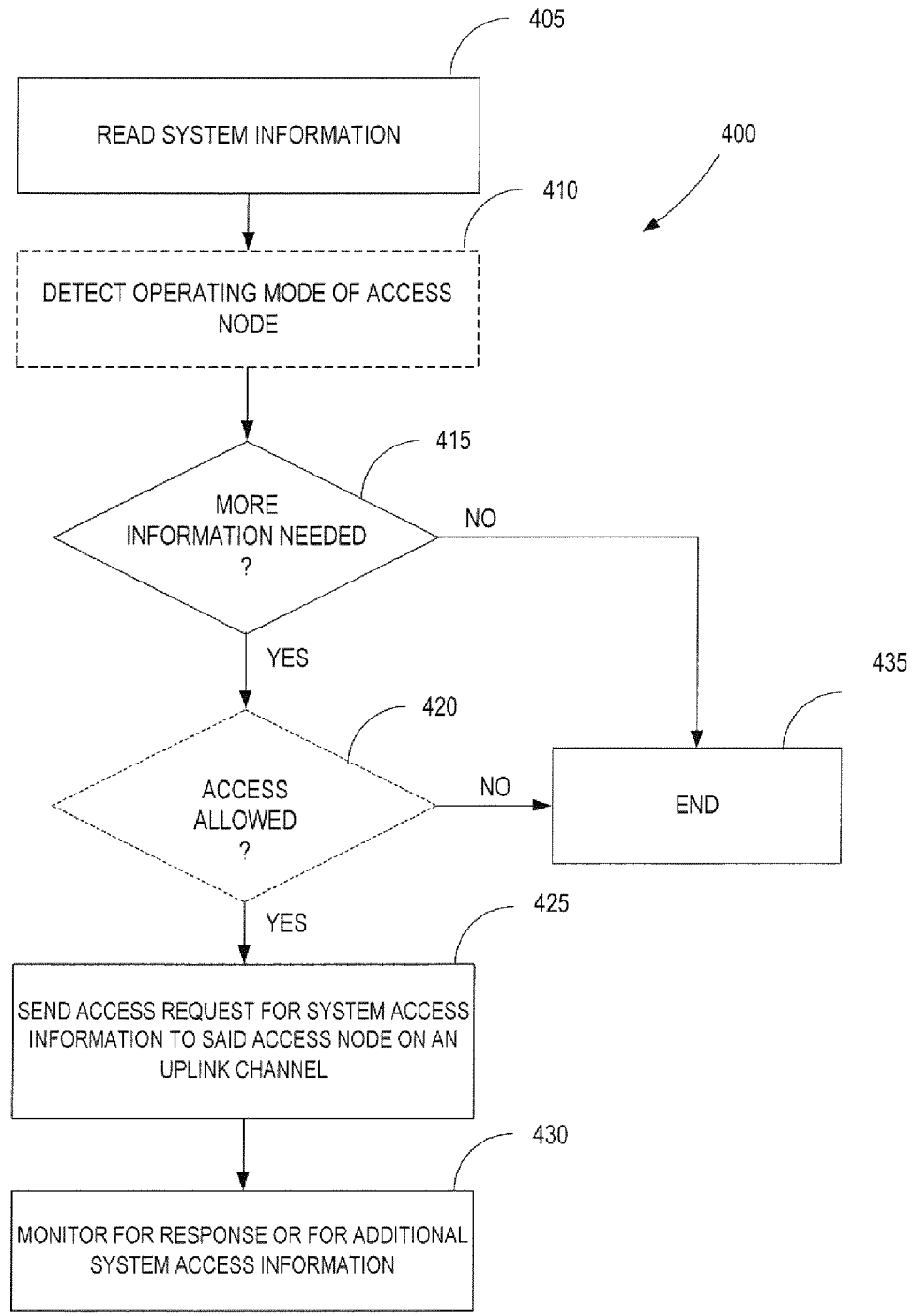
FIG. 9 illustrates an exemplary procedure implemented by wireless terminal for requesting system access information from an access node.

FIG. 9 illustrates an exemplary procedure 400 implemented by a wireless terminal 200 that needs to acquire system access information from an access node 100 that is in a low power mode. It is assumed in this embodiment that there are two or more operating modes including a normal power mode and low power mode. The wireless terminal 200 reads system access information transmitted by the access node 100 (block 405). In some embodiments, the wireless terminal 200 may optionally detect the operating mode of the access node 100 based on the received system access information (block 410). Detecting the operating mode may be accomplished in one embodiment by synchronizing with the access node 100 and reading system access information transmitted by the access node 100. Based on the received system access information and/or the detected operating mode, the wireless terminal 200 determines whether additional system access information is needed to access the network 10 (block 415). If not, the process ends and the wireless terminal 200 may perform a random access procedure to access the network 10 (block 435). If more information is needed, the wireless terminal 200 may optionally determine whether it is allowed to transmit an access request (block 420). As previously noted, the access node 100 may transmit an AA flag as part of the ISI in the low power mode to indicate whether access to the cell 20 is allowed. In some embodiment, access to the network 10 is presumed to be allowed absent an explicit prohibition. If access is not allowed or is prohibited, the procedure ends (block 435) and the wireless terminal 200 may search for another cell 20. If access is allowed, the wireless terminal 200 transmits the access request to the access node 100 (block 425) and listens for a response from the access node 100 (block 430). In some embodiments, the wireless terminal 200 may receive a stop indication or back-off indication from the access node 100 instructing the wireless terminal 200 to refrain from sending another access request. In other embodiments, the wireless terminal 200 may receive the additional system access information responsive to the access request. Also, as previously noted, the wireless terminal 200 may be configured to resend the access request if no response is received within a predetermined time period.

Figure 10:
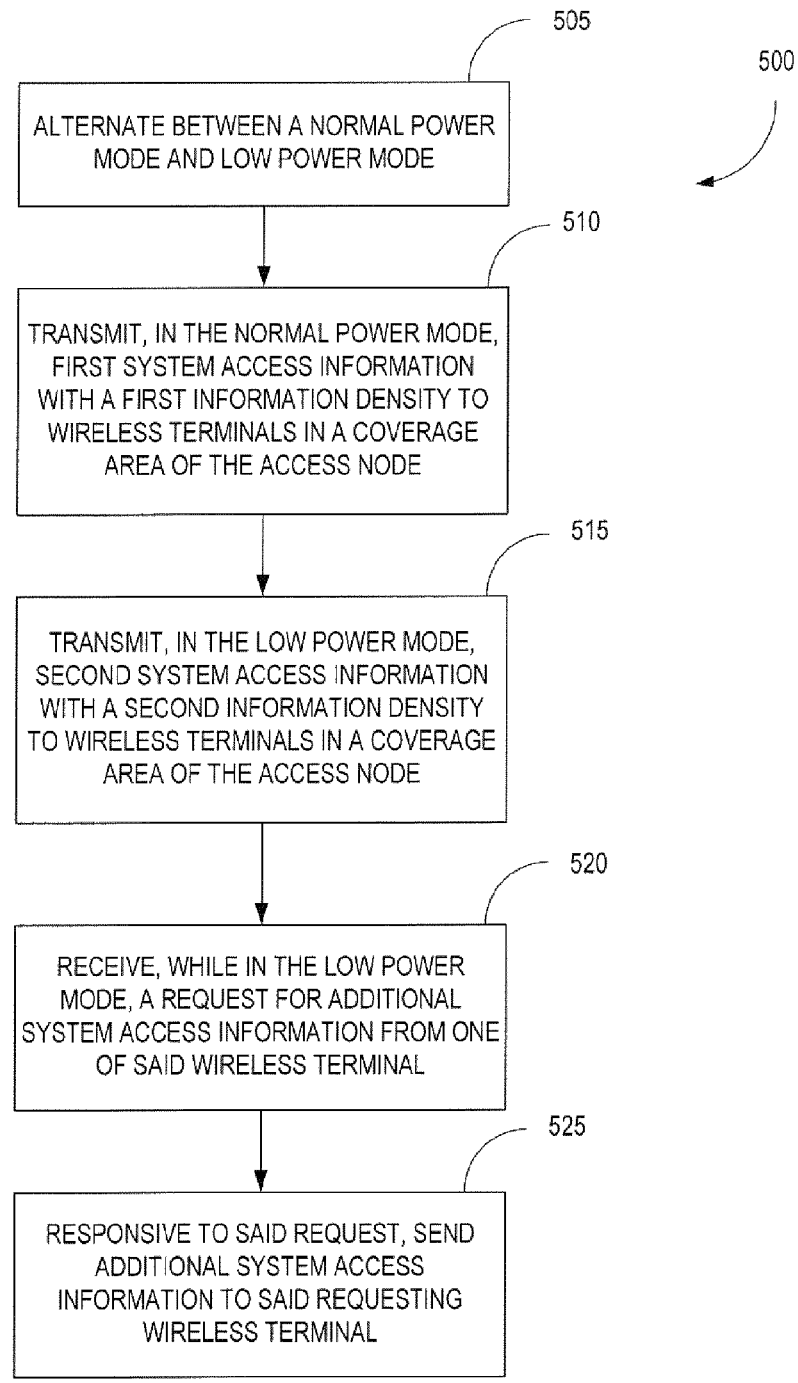
FIG. 10 illustrates an exemplary procedure implemented by an access node for transmitting system access information.

FIG. 10 illustrates an exemplary method 500 implemented by an access node 100 according to one embodiment. The access node 100 alternates between a normal power mode and a low power mode (block 505). The access node 100 may alternate between the normal power mode and low power mode based on a time of day, and amount of uplink signals received by the access node 100 in a predetermined period, and/or a load of the access node 100. While in the normal power mode, the access node 100 transmits first system access information with a first information density to the wireless terminals 200 in a coverage area of the access node 100 (block 510). In the low power mode, the access node 100 transmits second system access information with a second information density to the wireless terminals 200 in a coverage area of the access node 100 (block 515). The second information density is lower than the first information density so that less energy is consumed transmitting the second access information as compared to the first access information.

The first and second system access information may comprise system information, synchronization signals, and/or reference signals used for channel information. The information density of the system access information in the low power mode can be reduced by transmitting less than all of the system access information transmitted in the normal power mode. For example, the access node 100 may transmit less than all the system information and/or fewer reference signals. Alternatively, the information density of the system access information in the low power mode may be reduced by changing a periodicity of all or part of the system access information. For example, the periodicity of the system information, synchronization signals, and/or reference signals for channel estimation may be increased in the low power mode.

While in the low power mode, the access node 100 receives an access request from a wireless terminal 200 requesting additional system access information (block 520). Responsive to the access request, the access node 100 sends additional system access information to the requesting wireless terminals 200 (block 525). In one embodiment, the access node 100 changes to the normal power mode or other operating mode and transmits the additional system access information in the new operating mode. After transmitting the additional system access information, the access node 100 may return to the previous operating mode, remain in the new operating mode, or change to yet another operating mode. In some embodiments, the access node 100 may transmit the additional system access information to the requesting wireless terminal 200 while remaining in the low power mode.

In some embodiments, the additional system access information is transmitted on downlink resources indicated by the access request. For example, the downlink resources may be indicated by at least one of a time slot in which the request is received, a format of the request, or a value of the access request. In some embodiments, the time slot in which the access request is received indicates a time slot or time window for the transmission of the additional system access information. In embodiments, the frequency on which the access request is received indicates the frequency to use for transmission of the additional system access information.

Figure 11:
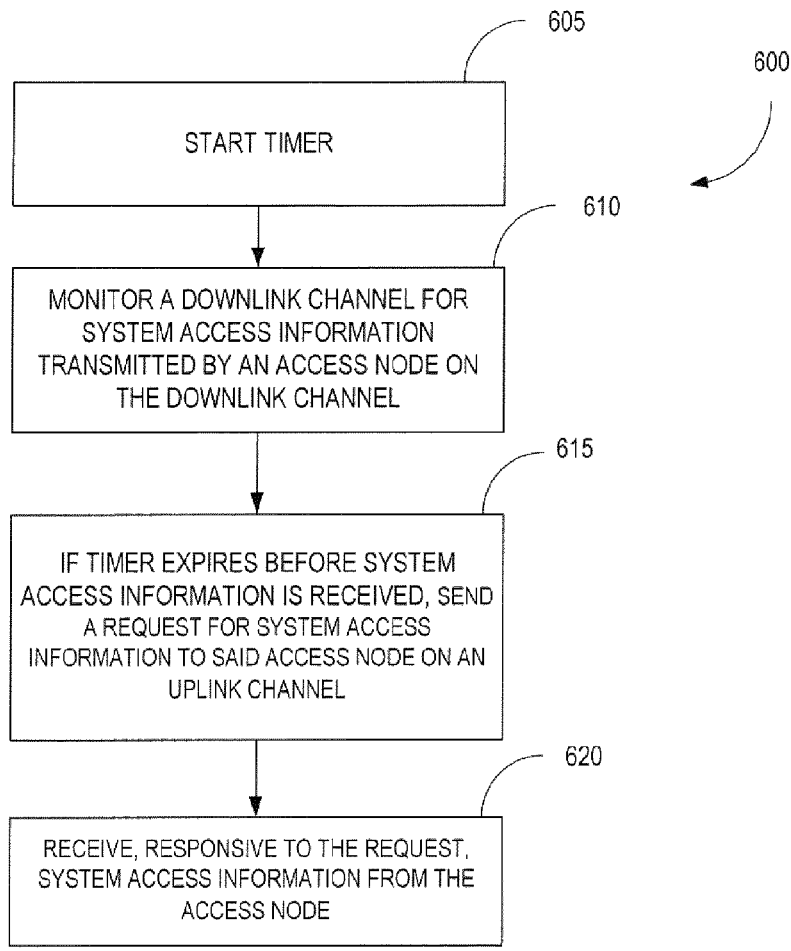
FIG. 11 illustrates an exemplary procedure implemented by wireless terminal for requesting system access information from an access node.

FIG. 11 illustrates an exemplary method 600 implemented by a wireless terminal 200 attempting to access a cell 20 in a wireless communication network 10. The method begins with the wireless terminal 200 starting a timer (block 605).

After starting the timer, the wireless terminal 200 monitors a downlink channel for system access information transmitted by the access node 100 on the downlink channel (block 610). The system access information may comprise system information, synchronization signals, and/or reference signals used for channel estimation. If the timer expires before detection of the system access information, the wireless terminal 200 sends a first access request to the access node 100 on an uplink channel to request system access information (block 615). In response to the access request, the wireless terminal 200 receives, from the access node 100, system access information on the downlink channel (block 620). In some embodiments, the wireless terminal 200 may send a first access request for system access information and receive, responsive to the first access request, a back-off indication from the access node 100 instructing the wireless terminal 200 to refrain from sending another request until the expiration of a back-off timer. In response to the back-off indication, the wireless terminal 200 may select a time slot from a back-off window and transmit a second access request to the access node 100.

In some embodiments, the access request indicates the downlink resources for the transmission of the system access information. For example, the downlink resources may be indicated by at least one of a time slot in which the request is transmitted, a frequency on which the access request is transmitted, a format of the access request, or a value of the access request. In some embodiments, the time slot or time window for transmission of the system access information is indicated by the time slot in which the request is transmitted. In other embodiments, a frequency for the transmission of the system access information is indicated by the frequency in which the request is transmitted.

Figure 12:
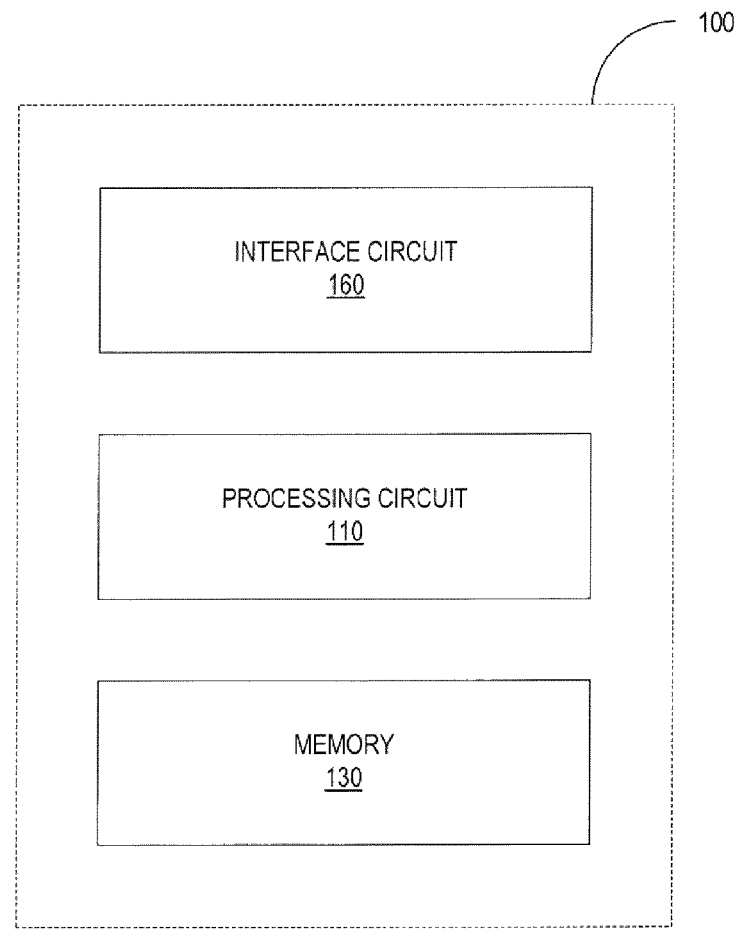
FIG. 12 illustrates an access node.

FIG. 12 illustrates an exemplary access node 100 configured to operate as herein described. The access node 100 comprises a processing circuit 110, a memory 130, and an interface circuit 160. The processing circuit 110 controls the operation of the access node 100 as herein described. The processing circuit 110 may comprise one or more microprocessors, microcontrollers, hardware circuits, firmware, or a combination thereof. Memory 130 stores program instructions and data needed by the processing circuit. Permanent data and program instructions executed by the processing circuit 110 may be stored in a non-volatile memory, such as a read only memory (ROM), electronically erasable programmable read only memory (EEPROM), flash memory, or other non-volatile memory device. A volatile memory, such as a random access memory (RAM), may be provided for storing temporary data. The memory 230 may comprise one or more discrete memory devices, or may be integrated with the processing circuit 110. The interface circuit 160 comprises a fully functional transceiver including a transmitter and receiver for communicating over a wireless channel with wireless terminals in the cells served by the access node 100. In one exemplary embodiment, the interface circuit 160 comprises a cellular transceiver circuit that operates according to LTE (Release 10) standard.

Figure 13:
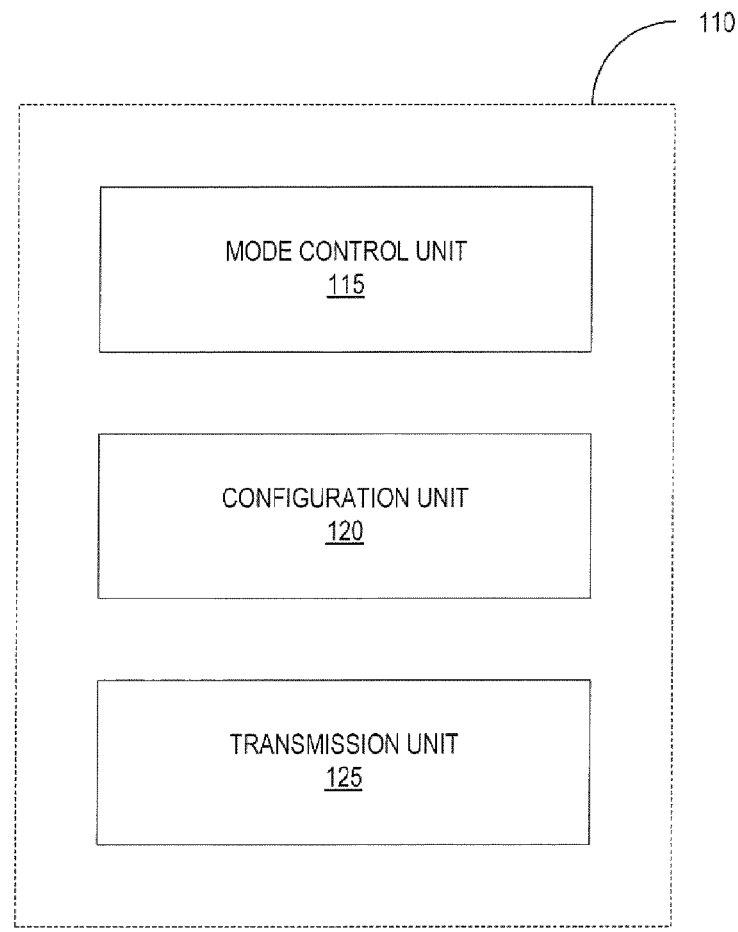
FIG. 13 illustrates a processing circuit for an access node.

FIG. 13 illustrates the main functional components of an exemplary processing circuit 110. The processing circuit 110 comprises a mode control unit 115, configuration unit 120, and transmission unit 125. A mode control unit 115, configuration unit 120, and transmission unit 125 can be implemented by one or more microprocessors, microcontrollers, hardware, firmware, or a combination thereof. In one embodiment, the mode control unit 115, configuration unit 120, and transmitting unit 120 are implemented by a single microprocessor and/or microcontroller. In other embodiments, the functions of the mode control unit 115, configuration unit 120, and transmission unit 125 may be distributed among two or more microprocessors, microcontrollers, or hardware circuits.

The primary function of the mode control unit 115 is to control the operating mode of the access node 100. The mode control unit 115 may autonomously determine the operating mode based on the time of day, cell load, or user identify within the cell served by the access node. In some embodiments, the mode control unit may report variables relevant to the operating mode to a management entity within the wireless communication network 10. The management entity may, based on the information provided by the mode control unit, indicate the operating mode for the access node.

The configuration unit 120 is responsive to control signals from the mode control unit 115 to configure the access node 100 for the selected operating mode. The configuration includes configuration of the system information, synchronization signals, and reference signals that are transmitted by the access node in each operating mode. The transmission unit 125 is responsible for responding to access requests from wireless terminals, and for formatting and transmitting the system access information.

Figure 14:
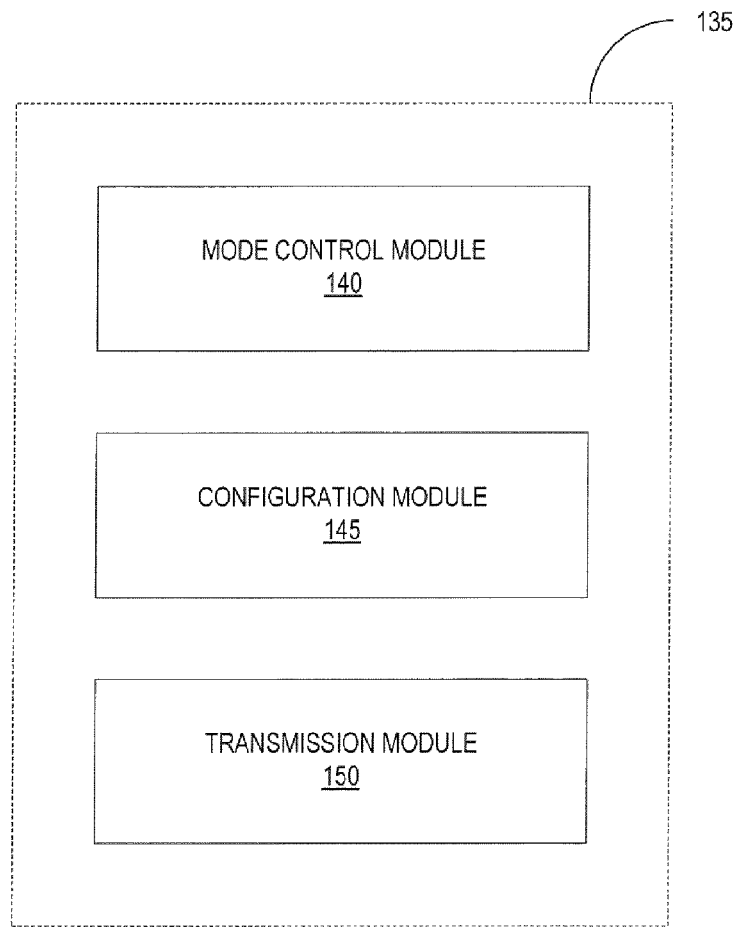
FIG. 14 illustrates a computer program product comprising code executed by an access node to receive system access information.

FIG. 14 illustrates an exemplary computer program product 135 embodying program code that is executed by an access node 100. The computer program product 135 may be stored in memory 130 or other computer readable medium. The computer program product 135 comprises a mode control module 140, configuration module 145, and transmission module 150. The mode control module 140 comprises program code that is executed by the processing circuit 110 to control the operating mode of the access node 100. The mode control module 140 includes code for determining the operating mode based on the time of day, cell load, or user identify within the cell served by the access node. In some embodiments, the mode control module 140 includes code for reporting variables relevant to the operating mode to a management entity within the wireless communication network 10. The management entity may, based on the information provided by the mode control unit, indicate the operating mode for the access node 100.

The configuration module 145 comprises program code that is executed by the processing circuit 110 to configure the access node 100 for the selected operating mode. The configuration includes configuration of the system information, synchronization signals, and reference signals that are transmitted by the access node in each operating mode. The transmission module 150 comprises program code that is executed by the processing circuit 110 for responding to access requests from wireless terminals, and for formatting and transmitting the system access information.

Figure 15:
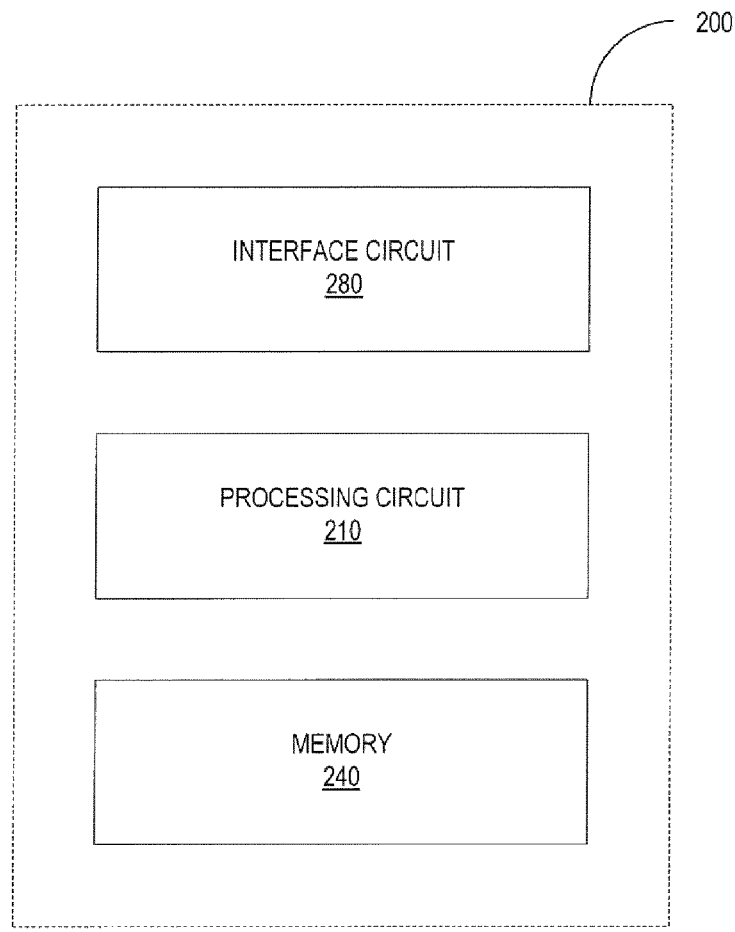
FIG. 15 illustrates a wireless terminal.

FIG. 15 illustrates an exemplary wireless terminal 200 configured to operate as herein described. The wireless terminal 200 comprises a processing circuit 210, a memory 240, and an interface circuit 280. The processing circuit 210 controls the operation of the access node 100 as herein described. The processing circuit 210 may comprise one or more microprocessors, microcontrollers, hardware circuits, firmware, or a combination thereof. Memory 240 stores program instructions and data needed by the processing circuit. The program instructions executed by the processing circuit 210 and permanent data may be stored in a nonvolatile memory, such as a read only memory (ROM), electronically erasable programmable read only memory (EEPROM), flash memory, or other nonvolatile memory device. A volatile memory, such as a random access memory (RAM), may be provided for storing temporary data and program instructions. The memory 240 may comprise one or more discrete memory devices, or may be integrated with the processing circuit 210. The interface circuit 280 comprises a fully functional transceiver including a transmitter and receiver for communicating over a wireless channel with access nodes 100 in the wireless communication network 10. In one exemplary embodiment, the interface circuit 280 comprises a cellular transceiver circuit that operates according to LTE (Release 10) standard modified as herein described.

Figure 16:
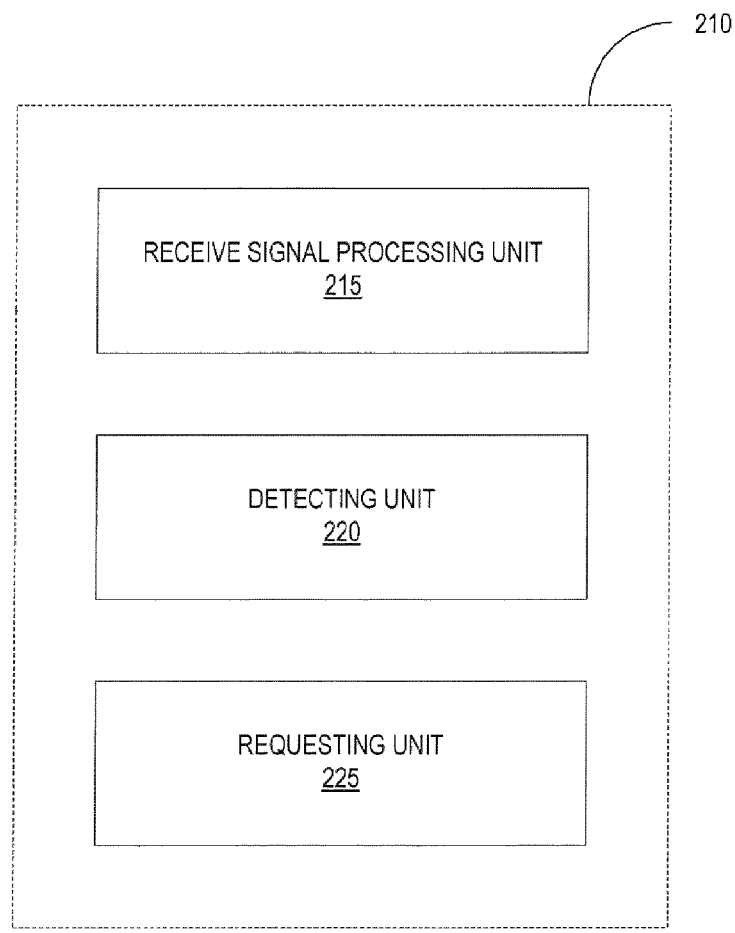
FIG. 16 illustrates a processing circuit for a wireless terminal.

FIG. 16 illustrates the main functional components of an exemplary processing circuit 210. The processing circuit 210 comprises a receive signal processing unit 215, detecting unit 220, and a requesting unit 225. The receive signal processing unit 215, detecting unit 220, and a requesting unit 225 can be implemented by one or more microprocessors, microcontrollers, hardware, firmware, or a combination thereof. In one embodiment, the receive signal processing unit 215, detecting unit 220, and a requesting unit 225 are implemented by a single microprocessor and/or microcontroller. In other embodiments, the functions of the receive signal processing unit 215, detecting unit 220, and a requesting unit 225 may be distributed among two or more microprocessors, microcontrollers, or hardware circuits.

The receive signal processing unit processes signals received by the wireless terminal 100, including the synchronization signals, reference signals, and system information signals. Functions performed by the receive signal processing unit 215 include time and frequency synchronization, channel estimation, and decoding of system information. The detecting unit 220 detects a current operating mode of the access node as herein described. The requesting unit 225 is responsible for sending access requests to the access node to request additional system access information.

Figure 17:
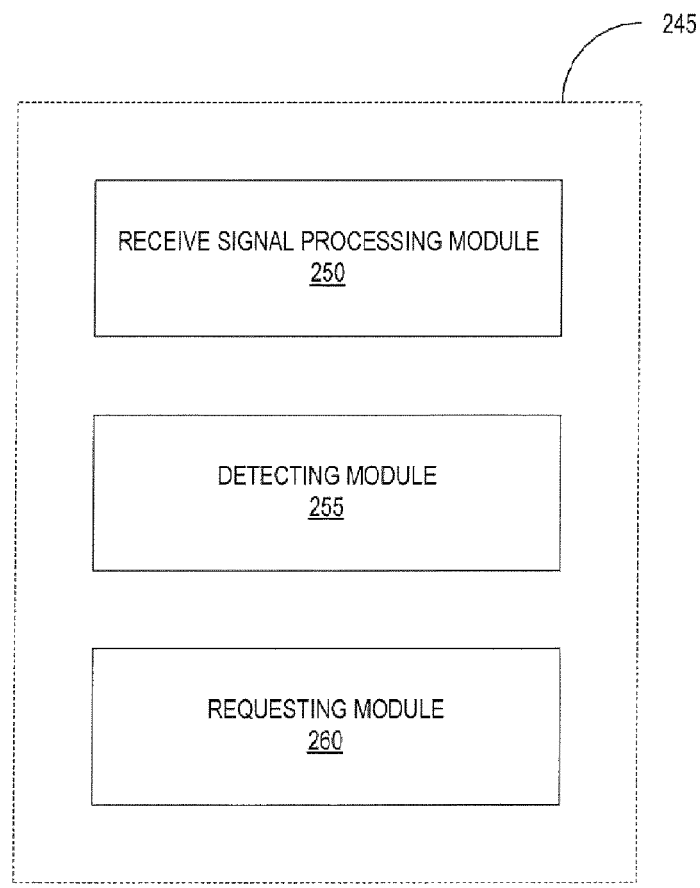
FIG. 17 illustrates a computer program product comprising code executed by a wireless terminal to receive system access information.

FIG. 17 illustrates an exemplary computer program product 245 according to one embodiment of the disclosure, which may be stored in memory 240 or other non-transitory computer readable medium. The computer program product 245 comprises a receive signal processing module 250, detecting module 255, and a requesting module 260. The receive signal processing module 250 comprises code that is executed by the processing circuit 210 to processes signals received by the wireless terminal 200, including the synchronization signals, reference signals, and system information signals. The receive signal processing module 250 includes code for time and frequency synchronization, channel estimation, and decoding of system information. The detecting module 255 comprises code that is executed by the processing circuit to0 detect a current operating mode of the access node 200 as herein described. The requesting module 260 comprises code that is executed by the processing circuit to send access requests to the access node to request additional system access information.

The procedures described herein enable the network 10 to conserve energy by sending less system access information when there is little or no activity within a cell 20. As previously indicated, the access node 100 may transmit a limited set of system access in a low power mode. When a wireless terminal 200 needs to access a network 10, the wireless terminal 200 may detect that the access node 100 is in a low power mode and send an access request to the access node 100. Responsive to the access request, the access node 100 may either change operating modes, or send additional system access information while remaining in the low power mode. The operating modes of the access nodes 100 within a network 10 may be centrally managed or may be managed in a distributed fashion.

What is claimed is:

1. A method implemented by an access node in a cell of a wireless communication network, the method comprising the access node:
    alternating between two or more operating modes including a normal power mode and low power mode;
    transmitting, in the normal power mode, first system access information with a first information density to wireless terminals in a coverage area of the access node;
    transmitting, in the low power mode, second system access information with a second information density to the wireless terminals in the coverage area of the access node, the second information density being lower than the first information density, and wherein transmitting the second system access information in the low power mode comprises transmitting initial system information that comprises:
        less than all the system information transmitted in the normal power mode; and
        an access allowed flag indicating whether the wireless terminals are allowed to transmit access requests for additional system access information to a cell served by the access node after acquiring synchronization;
    receiving, while in the low power mode, an access request for the additional system access information from one of the wireless terminals, wherein the access request indicates downlink resources on which the access node is to transmit the additional access system information; and
    responsive to the access request and while remaining in the low power mode, sending the additional system access information on the downlink resources indicated in the access request to the access requesting wireless terminal.

2. The method of claim 1, wherein transmitting, in the low power mode, the second system access information further comprises
    transmitting at least some of the second system access information with a longer periodicity as compared to the normal power mode.

3. The method of claim 1, wherein the initial system information further includes information indicating a current operating mode of the access node.

4. The method of claim 1 wherein the downlink resources are indicated in the access request by a time slot in which the request is received.

5. The method of claim 4 wherein the time slot in which the access request is received indicates a time slot or time window for the transmission of the additional system access information.

6. An access node for operation in a cell of a wireless communication network, the access node comprising:
    processing circuitry; and
    memory containing instructions executable by the processing circuitry whereby the access node is operative to:
        alternate between two or more operating modes including a normal power mode and low power mode;
        transmit in the normal power mode, first system access information with a first information density to wireless terminals in a coverage area of the access node;
        transmit, in the low power mode, second system access information with a second information density to the wireless terminals in the coverage area of the access node, the second information density being lower than the first information density, and wherein to transmit the second system access information in the low power mode, the access node is configured to transmit initial system information that comprises:
- less than all the system information transmitted in the normal power mode; and
- an access allowed flag indicating whether wireless terminals are allowed to transmit access requests for additional system access information to a cell served by the access node after acquiring synchronization;

receive, while in the low power mode, an access request for the additional system access information from one of the wireless terminals, wherein the access request indicates downlink resources on which the access node is to transmit the additional access system information; and responsive to the access request and while remaining in the low power mode, send the additional system access information on the downlink resources indicated in the access request to the access requesting wireless terminal.

7. A method implemented by a wireless terminal, the method comprising the wireless terminal:
starting a timer;
monitoring a downlink channel for initial system access information transmitted by an access node on the downlink channel, wherein the initial system information comprises an access allowed flag indicating whether the wireless terminal is allowed to transmit access requests for additional system access information to a cell served by the access node after acquiring synchronization;
in response to the timer expiring before detection of the initial system access information, sending an access request to the access node on an uplink channel to request additional system access information, wherein the access request indicates downlink resources on which the access node is to transmit the additional access system information; and
receiving, responsive to the access request, the additional system access information from the access node on the downlink resources indicated in the access request.

8. The method of claim 7, wherein monitoring the downlink channel for the initial system access information further comprises monitoring the downlink channel for synchronization signals.

9. The method of claim 8, further comprising:
receiving the initial system information from the access node before the expiration of the timer;
determining, based on the initial system information, that the access node is in a low power mode and that transmitting an access request for the additional system access information to the cell served by the access node is allowed; and sending, responsive to the determining, the access request to the access node to request the additional system access information.

10. The method of claim 9, wherein the access request indicates the downlink resources for the transmission of the additional system access information.

11. The method of claim 10, wherein the downlink resources are indicated by at least one of a time slot in which the access request is received, a format of the access request, a value of the access request.

12. The method of claim 11, wherein a time slot or time window for the transmission of the additional system information, reference signals, or both is indicated by the time slot in which the access request is transmitted.

13. The method of claim 11, wherein a frequency for the transmission of the additional system access information is indicated by the frequency in which the access request is transmitted.

14. The method of claim 7:
wherein sending the access request to the access node on the uplink channel to request the system access information comprises:
sending a first access request to the access node;
receiving a back-off indication from the access node instructing the wireless terminal to refrain from sending further access requests until the expiration of a back-off period;
sending a second access request to the access node; and
wherein receiving, responsive to the access request, the system access information from the access node comprises receiving the system access information responsive to the second access request.

15. A wireless terminal, comprising:
processing circuitry; and
memory containing instructions executable by the processing circuitry whereby the wireless terminal is operative to:
start a timer;
monitor a downlink channel for initial system access information transmitted by an access node on the downlink channel, wherein the initial system information comprises an access allowed flag indicating whether the wireless terminal is allowed to transmit access requests for additional system access information to a cell served by the access node after acquiring synchronization;
in response to the timer expiring before detection of the initial system access information, send an access request to the access node on an uplink channel to request additional system access information, wherein the access request indicates downlink resources on which the access node is to transmit the additional access system information;
receive, responsive to the access request, the additional system access information from the access node on the downlink resources indicated in the access request.

* * * * *